US012598612B2

(12) United States Patent
Gou et al.

(10) Patent No.: US 12,598,612 B2
(45) Date of Patent: Apr. 7, 2026

(54) DYNAMIC RESOURCE SCHEDULING IN WIRELESS COMMUNICATIONS

(71) Applicant: ZTE Corporation, Shenzhen (CN)

(72) Inventors: Wei Gou, Shenzhen (CN); Peng Hao, Shenzhen (CN); Junfeng Zhang, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 18/490,424

(22) Filed: Oct. 19, 2023

(65) Prior Publication Data

US 2024/0121785 A1      Apr. 11, 2024

Related U.S. Application Data

(63) Continuation of application No. PCT/CN2021/110973, filed on Aug. 5, 2021.

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC .. H04W 72/21; H04W 72/0446; H04L 5/0044
See application file for complete search history.

(56) References Cited

U.S. PATENT DOCUMENTS

| | | | |
|---|---|---|---|
| 2018/0131425 A1* | 5/2018 | Li | H04W 72/046 |
| 2020/0214006 A1 | 7/2020 | Choi et al. | |
| 2020/0259538 A1 | 8/2020 | Tomeba et al. | |
| 2020/0267511 A1 | 8/2020 | Abdoli et al. | |
| 2020/0328849 A1 | 10/2020 | Noh et al. | |
| 2020/0374091 A1 | 11/2020 | Shao et al. | |

(Continued)

FOREIGN PATENT DOCUMENTS

| | | |
|---|---|---|
| WO | 2019/041240 A1 | 3/2019 |
| WO | 2019/216620 A1 | 11/2019 |
| WO | 2020/221303 A1 | 11/2020 |

OTHER PUBLICATIONS

Extended European Search Report for European Patent Application No. 21952327.1, mailed Oct. 28, 2024 (12 pages).

(Continued)

*Primary Examiner* — Gbemileke J Onamuti
(74) *Attorney, Agent, or Firm* — Perkins Coie LLP

(57) ABSTRACT

Methods, apparatus, and systems that enable retransmissions and/or transmission of uplink feedback information using different carriers are disclosed. In one example aspect, a method for wireless communication includes receiving, by a terminal device, a signaling message from a base station. The signaling message includes a field indicting one or more resources for a set of frequency blocks from N sets of frequency blocks configured for a transmission from the terminal device to the base station. Each set of frequency blocks corresponds to a carrier or a bandwidth part, and N is a positive integer greater than 1. The method also includes performing the transmission using the one or more resources indicated in the signaling message.

20 Claims, 11 Drawing Sheets

400 receiving, by a terminal device, a first transmission from a base station
410 determining, by the terminal device, a slot position of a reference set of frequency blocks based on the first transmission and a timing parameter for a second transmission from the terminal device to the base station
420 determining, by the terminal device based on the slot position of the reference set of frequency blocks, a first set of frequency blocks and a slot position of the first set of frequency blocks for the second transmission
430 performing, by the terminal device, the second transmission at the slot position of the first set of frequency blocks
440

(56) References Cited

U.S. PATENT DOCUMENTS

2021/0029708 A1    1/2021  Khoshnevisan et al.
2021/0045105 A1    2/2021  Yoon et al.

OTHER PUBLICATIONS

Communication pursuant to Article 94(3) EPC for European Patent Application No. 21952327.1, mailed Aug. 26, 2025 (10 pages).
International Search Report & Written Opinion for Appl. No. PCT/CN2021/110973, mailed Apr. 26, 2022, 7 pages.
Communication pursuant to Article 94(3) EPC for European Patent Application No. 21952327.1, mailed Feb. 6, 2026 (8 pages).
Office Action for Korean Patent Application No. 10-2023-7035121, mailed Feb. 20, 2026 (12 pages).
Nokia et al., "HARQ-ACK Feedback Enhancements for URLLC/IIoT," 3GPP TSG RAN WG1 #104-e-bis, R1-2102819, e-Meeting, Apr. 12-20, 2021 (20 pages).

* cited by examiner

200 receiving, by a terminal device, a signaling message from a base station that includes a field indicting one or more resources for a set of resource blocks from N sets of resource blocks configured for a transmission from the terminal device to the base station

210 performing the transmission using the one or more resources indicated in the signaling message

220

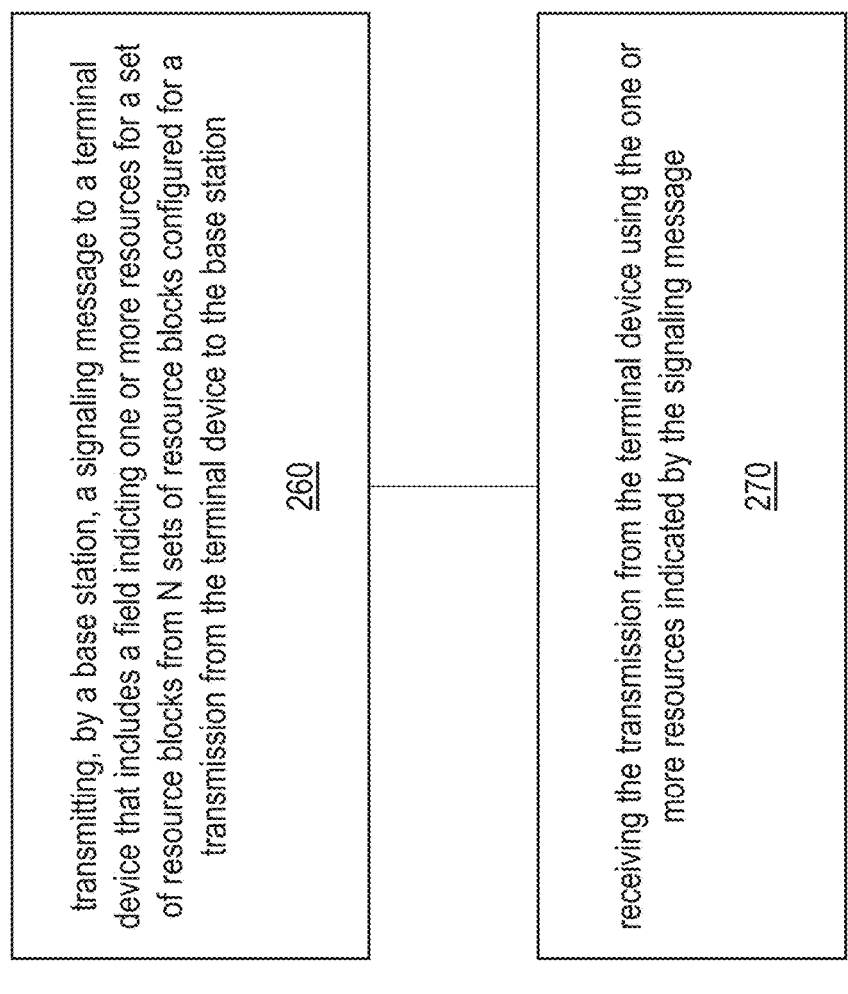

transmitting, by a base station, a signaling message to a terminal device that includes a field indicting one or more resources for a set of resource blocks from N sets of resource blocks configured for a transmission from the terminal device to the base station

260 receiving the transmission from the terminal device using the one or more resources indicated by the signaling message

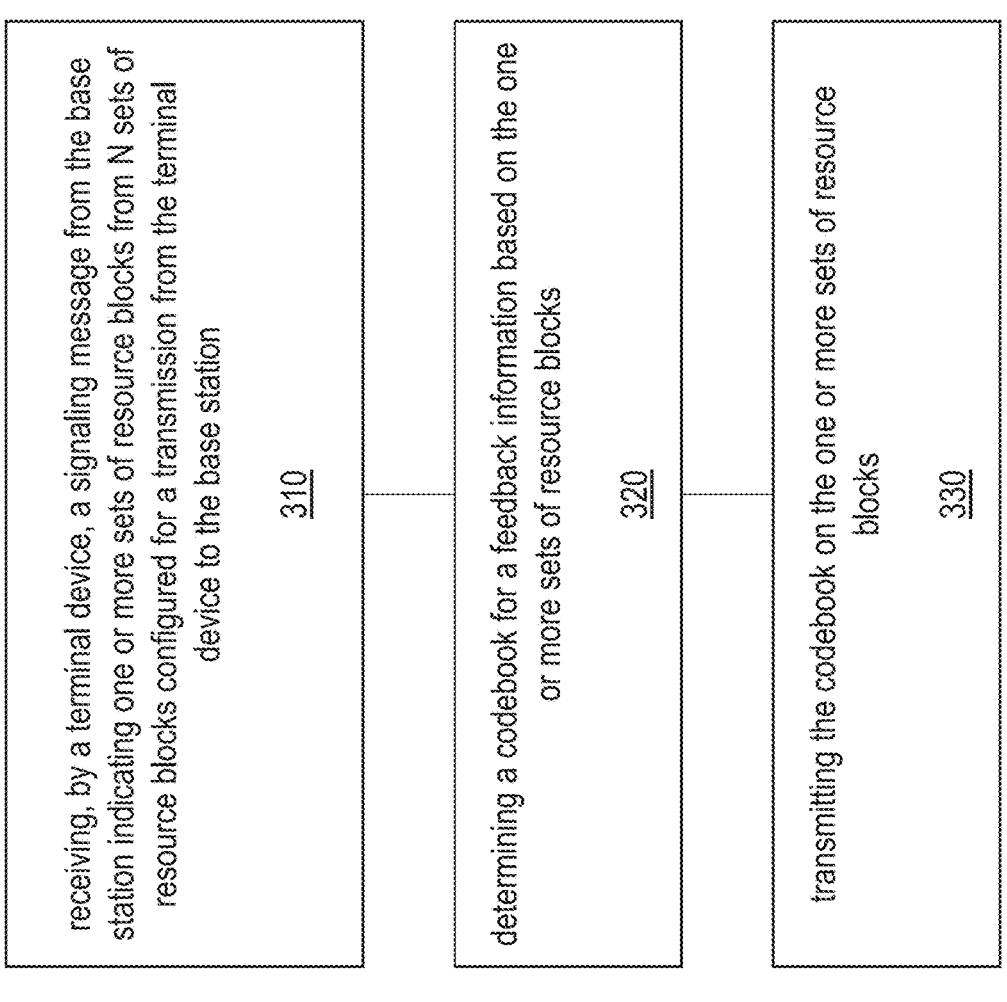

receiving, by a terminal device, a signaling message from the base station indicating one or more sets of resource blocks from N sets of resource blocks configured for a transmission from the terminal device to the base station

310 determining a codebook for a feedback information based on the one or more sets of resource blocks

320 transmitting the codebook on the one or more sets of resource blocks

350 transmitting, by a base station, a signaling message to a terminal device indicating one or more sets of resource blocks from N sets of resource blocks configured for a transmission from the terminal device to the base station

360 receiving a codebook for a feedback information from the terminal device determined based on the one or more sets of resource blocks

370

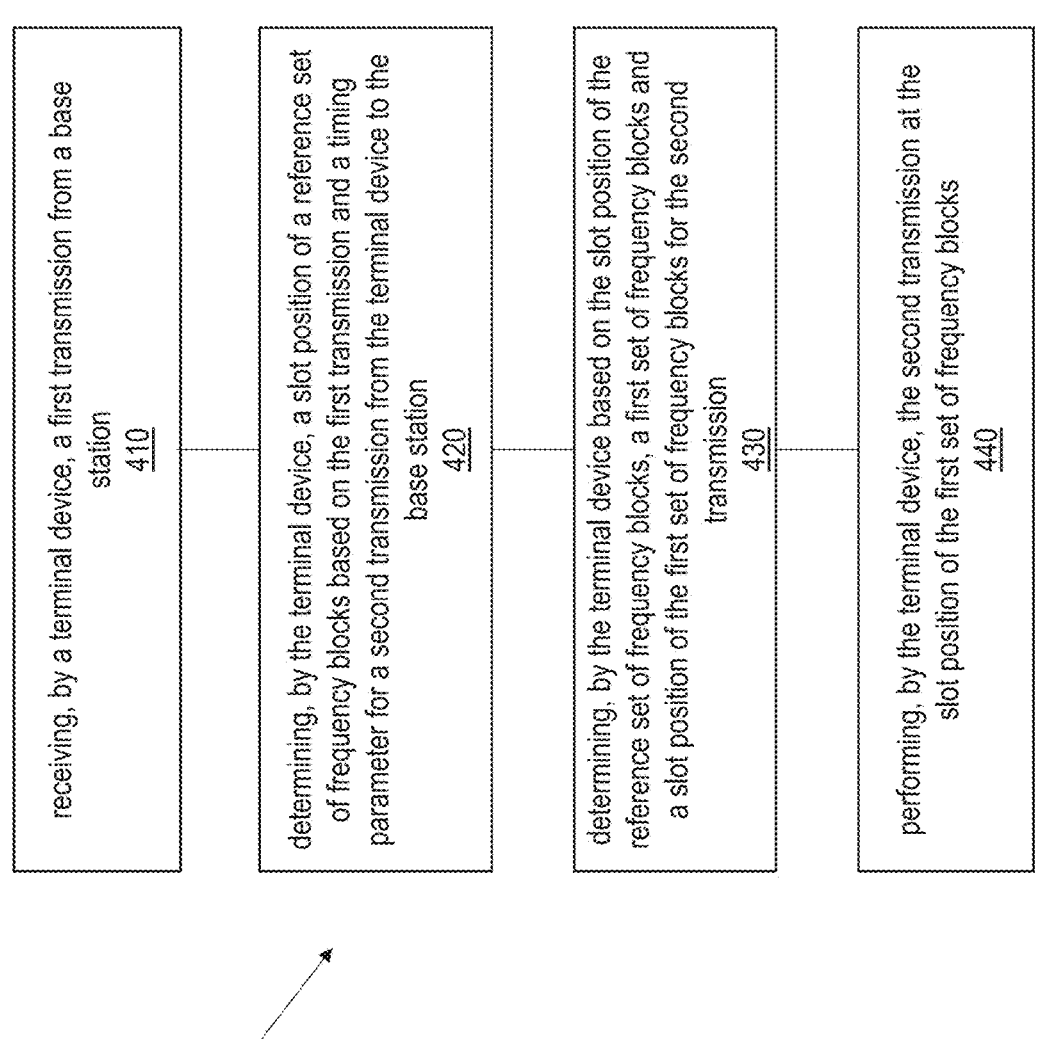

400 receiving, by a terminal device, a first transmission from a base station
410 determining, by the terminal device, a slot position of a reference set of frequency blocks based on the first transmission and a timing parameter for a second transmission from the terminal device to the base station
420 determining, by the terminal device based on the slot position of the reference set of frequency blocks, a first set of frequency blocks and a slot position of the first set of frequency blocks for the second transmission
430 performing, by the terminal device, the second transmission at the slot position of the first set of frequency blocks
440

FIG. 4A

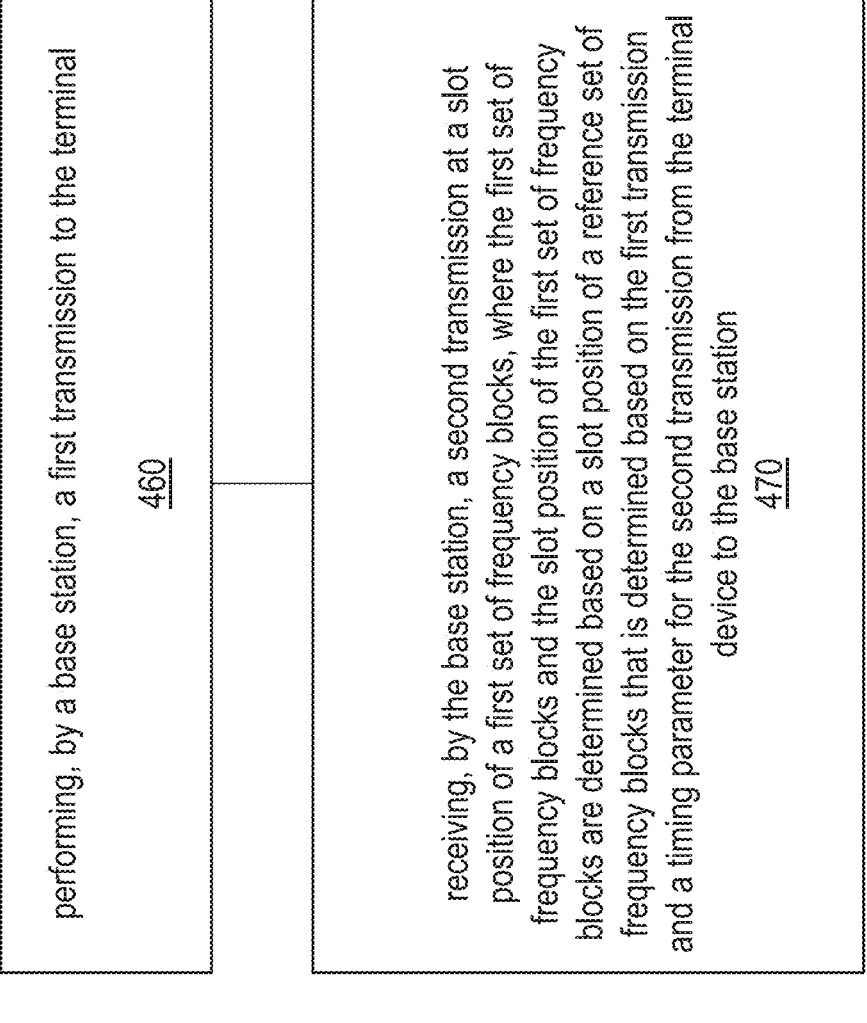

performing, by a base station, a first transmission to the terminal
460 receiving, by the base station, a second transmission at a slot position of a first set of frequency blocks, where the first set of frequency blocks and the slot position of the first set of frequency blocks are determined based on a slot position of a reference set of frequency blocks that is determined based on the first transmission and a timing parameter for the second transmission from the terminal device to the base station
470

DYNAMIC RESOURCE SCHEDULING IN WIRELESS COMMUNICATIONS

CROSS REFERENCE TO RELATED APPLICATIONS

This patent document is a continuation of and claims benefit of priority to International Patent Application No. PCT/CN2021/110973, filed on Aug. 5, 2021. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable a mobile device to perform uplink transmission of feedback information, or retransmission in both uplink and downlink direction on multiple carriers and/or bandwidth parts.

In one example aspect, a method for wireless communication includes receiving, by a terminal device, a signaling message from a base station. The signaling message includes a field indicting one or more resources for a set of frequency blocks from N sets of frequency blocks configured for a transmission from the terminal device to the base station. Each set of frequency blocks corresponds to a carrier or a bandwidth part, and N is a positive integer greater than 1. The method also includes performing the transmission using the one or more resources indicated in the signaling message.

In another example aspect, a method for wireless communication includes transmitting, by a base station, a signaling message to a terminal device. The signaling message includes a field indicting one or more resources for a set of frequency blocks from N sets of frequency blocks configured for a transmission from the terminal device to the base station. Each set of frequency blocks corresponds to a carrier or a bandwidth part, and N is a positive integer greater than 1. The method includes receiving the transmission from the terminal device using the one or more resources indicated by the signaling message.

In another example aspect, a method for wireless communication includes receiving, by a terminal device, a signaling message from the base station indicating one or more sets of frequency blocks from N sets of frequency blocks configured for a transmission from the terminal device to the base station. Each set of frequency blocks corresponds to a carrier or a bandwidth part, and N is a positive integer greater than 1. The method includes determining a codebook for a feedback information based on the one or more sets of frequency blocks and transmitting the codebook on the one or more sets of frequency blocks.

In another example aspect, a method for wireless communication includes transmitting, by a base station, a signaling message to a terminal device indicating one or more sets of frequency blocks from N sets of frequency blocks configured for a transmission from the terminal device to the base station. Each set of frequency blocks corresponds to a carrier or a bandwidth part, and N is a positive integer greater than 1. The method includes receiving a codebook for a feedback information from the terminal device. The codebook is determined based on the one or more sets of frequency blocks.

In another example aspect, a method for wireless communication includes receiving, by a terminal device, a first transmission from a base station and determining, by the terminal device, a slot position of a reference set of frequency blocks based on the first transmission and a timing parameter for a second transmission from the terminal device to the base station. A set of frequency blocks corresponds to a carrier or a bandwidth part. The method also includes determining, by the terminal device based on the slot position of the reference set of frequency blocks, a first set of frequency blocks and a slot position of the first set of frequency blocks for the second transmission and performing, by the terminal device, the second transmission at the slot position of the first set of frequency blocks.

In another example aspect, a method for wireless communication includes performing, by a base station, a first transmission to the terminal. The method also includes receiving, by the base station, a second transmission at a slot position of a first set of frequency blocks. The first set of frequency blocks and the slot position of the first set of frequency blocks are determined based on a slot position of a reference set of frequency blocks that is determined based on the first transmission and a timing parameter for the second transmission from the terminal device to the base station. A set of frequency blocks corresponds to a carrier or a bandwidth part.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 2B is a flowchart representation of another method for wireless communication in accordance with one or more embodiments of the present technology.

FIG. 3A is a flowchart representation of a method for wireless communication in accordance with one or more embodiments of the present technology.

FIG. 4A is a flowchart representation of a method for wireless communication in accordance with one or more embodiments of the present technology.

FIG. 4B is a flowchart representation of another method for wireless communication in accordance with one or more embodiments of the present technology.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Figure 1:
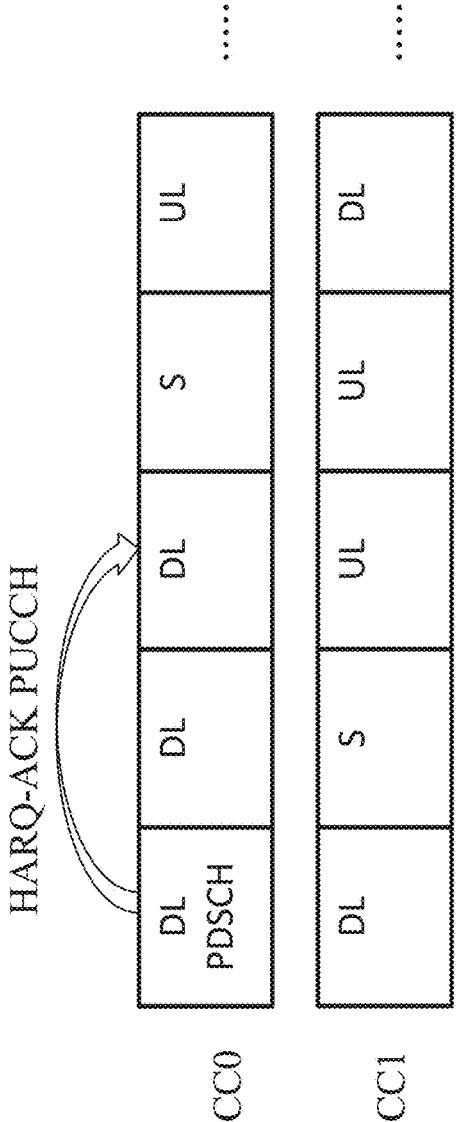
FIG. 1 illustrates an example scheduling conflict for a UE that is configured with CA using two carrier components.

Carrier aggregation (CA) is a technique used in wireless communication to increase the data rate by assigning multiple resource blocks (referred to component carriers) to the same user. Currently, when CA is enabled for a user equipment (UE), the UE always transmits the Hybrid Automatic Repeat request (HARQ) acknowledgment (ACK) information in the uplink carrier associated with the primary cell (PCell). However, scheduling conflicts can happen due to the restrictions on the primary cell. FIG. 1 illustrates an example scheduling conflict for a UE that is configured with CA using two carrier components: CC0 and CC1. In this example, CC0 is the primary carrier and CC1 is a carrier on a secondary cell (SCell). The UE is scheduled to report HARQ-ACK feedback in the third slot after receiving the transmission in the Physical Downlink Shared Channel (PDSCH). For services such as the Ultra-Reliable Low-Latency Communications (URLLC), the transmission cannot be delay. However, the third slot is configured as a downlink (DL) slot so the feedback information cannot be transmitted in the uplink direction on the Physical Uplink Control Channel (PUCCH).

A similar problem exists for data retransmissions and Bandwidth Part (BWP) based scheduling. A BWP is a contiguous set of physical resource blocks (PRBs) on a given carrier. Currently, if the initial transmission on the Physical Uplink Shared Channel (PUSCH) or the physical Downlink Shared Channel (PDSCH) is scheduled in a first carrier or a first BWP, the retransmission on the PUSCH/PDSCH must be scheduled in the same carrier or BWP. However, if the corresponding slot for the PUSCH retransmission in the carrier or BWP is not configured as suitable for the retransmission, the retransmission cannot be performed, thereby causing additional latency that is not permitted by services such as URLLC.

This patent document discloses techniques that can be implemented to enable uplink transmissions of feedback information (e.g., HARQ-ACK) and/or retransmissions to be scheduled in different carriers and/or bandwidth parts. Using the disclosed techniques, timely transmissions of the HARQ-ACK feedback information and/or retransmissions can be achieved to satisfy the latency requirements. The disclosed techniques can be used for scheduling of transmissions using one or more sets of resource blocks in the frequency domain, e.g., one or more carriers or one or more BWPs. It is also noted that one carrier can refer to one or more component carriers of a serving cell.

To enable uplink transmissions of feedback information (e.g., HARQ-ACK) and/or retransmissions to be scheduled in different carriers and/or bandwidth parts, the base station needs to signal the appropriate information of the carrier/BWP to the UE. In some embodiments, the signaling can be performed dynamically using the Downlink Control Information (DCI) signaling. In some embodiments, the signaling can be a higher-layer signaling message, such as the Radio Resource Configuration (RRC) signaling. Existing fields or formats of the signaling message can be adapted to include the additional information regarding different carriers/BWPs.

Figure 2A:
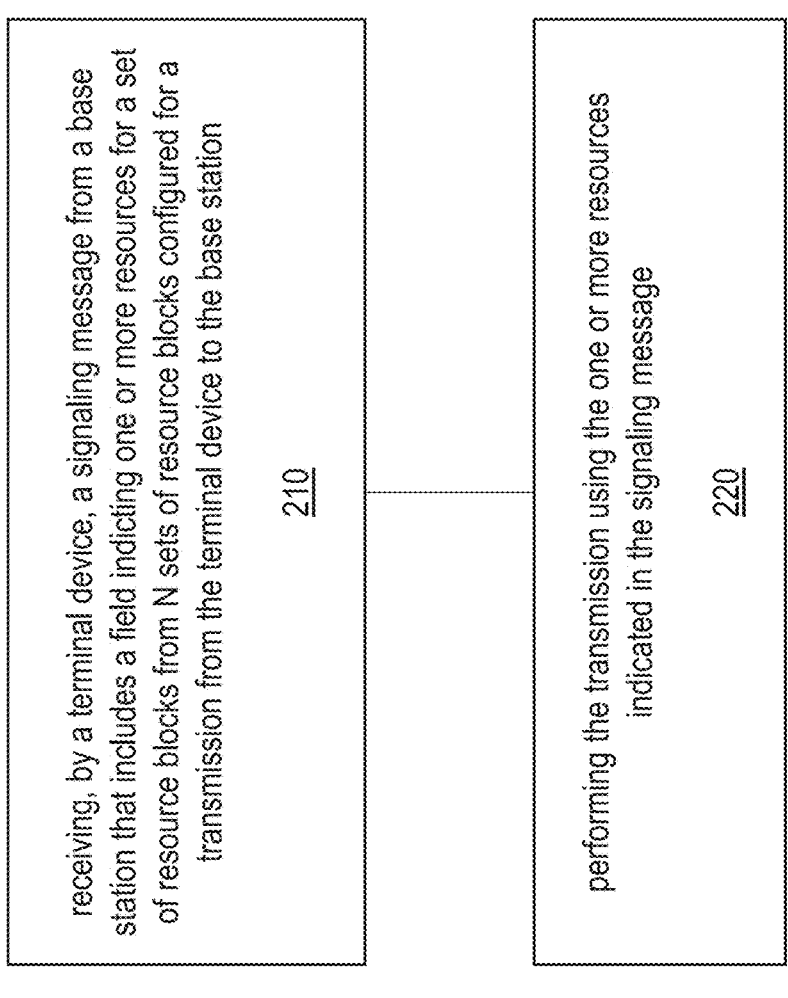
FIG. 2A is a flowchart representation of a method for wireless communication in accordance with one or more embodiments of the present technology.

FIG. 2A is a flowchart representation of a method for wireless communication in accordance with one or more embodiments of the present technology. The method 200 includes, at operation 210, receiving, by a terminal device, a signaling message from a base station. The signaling message includes a field indicting one or more resources for a set of resource blocks from N sets of resource blocks configured for a transmission from the terminal device to the base station. Each set of resource blocks corresponds to a carrier or a bandwidth part, where N is a positive integer greater than 1. The method 200 also includes, at operation 220, performing the transmission using the one or more resources indicated in the signaling message.

In some embodiments, the method includes determining, by the terminal device, the bit width of the field based on a value of N. The bit width of the field can be a non-constant function of N (e.g., $\log_2(N)$). In some embodiments, the method includes receiving, by the terminal device, a second signaling from the base station indicating the bit width of the field determined based on a value of N.

In some embodiments, the signaling message includes a second field indicating a timing parameter (e.g., k1) for the transmission on the set of resource blocks. The bit width of the second field is based on timing parameters configured for the N sets of resource blocks. In some embodiments, each set of resource blocks is configured with a number of timing parameters. The bit width of the second field is a non-constant function of a maximum number of the timing parameters configured for one of the N sets of resource blocks (e.g., $\log_2$ (maximum number of the timing parameters for a set of resource blocks)).

In some embodiments, the bit width of the field is based on K activated sets of resource blocks of the N sets of resource blocks configured for the terminal device, where K is a positive integer greater than 1 and smaller or equal to N.

In some embodiments, the method includes performing another transmission subsequent to the transmission using a default set of resource blocks of the N carriers. That is, configuration information indicated in the signaling message is only effective for the current transmission. In some embodiments, the method includes performing at least one other transmission subsequent to the transmission using the set of resource blocks indicated by the signaling message.

The same configuration information is valid until configured differently by another signaling message.

In some embodiments, the method includes receiving, by the terminal device, a third signaling message from the base station indicating one or more resources in another set of resource blocks of the N sets of resource blocks for another transmission. The one or more resources indicated in the signaling message and the one or more resources indicated in the third signaling message are configured to be non-overlapping in time domain. The method also includes performing the other transmission using the one or more resources in the other set of resource blocks indicated by the third signaling message.

In some embodiments, the method includes receiving, by the terminal device prior to receiving the signaling message, a third signaling message indicating one or more resources in another set of resource blocks of the N sets of resource blocks for another transmission. The one or more resources indicated in the signaling message and the one or more resources indicated in the third signaling message are configured to be overlapping in time domain. The method also includes multiplexing information of the transmission and the other transmission based on an index of the set of resource blocks indicated by the signaling message (e.g., based on the later received signaling message).

In some embodiments, the signaling message includes the field indicating one or more resources for the set of resource blocks in response to a different field included in the signal message indicating the set of resource blocks configured for the transmission from the terminal device to the base station.

FIG. 2B is a flowchart representation of a method for wireless communication in accordance with one or more embodiments of the present technology. The method 250 includes, at operation 260, transmitting, by a base station, a signaling message to a terminal device. The signaling message includes a field indicting one or more resources for a set of resource blocks from N sets of resource blocks configured for a transmission from the terminal device to the base station. Each set of resource blocks corresponds to a carrier or a bandwidth part, where N is a positive integer greater than 1. The method 250 also includes, at operation 270, receiving the transmission from the terminal device using the one or more resources indicated by the signaling message.

In some embodiments, the method includes transmitting, by the base station, a second signaling to the terminal device indicating the bit width of the field determined based on a value of N. The bit width of the field is a non-constant function of N (e.g., log 2(N)).

In some embodiments, the signaling message includes a second field indicating a timing parameter (e.g., k1) for the transmission on the set of resource blocks. A bit width of the second field is based on timing parameters configured for the N sets of resource blocks. In some embodiments, each set of resource blocks is configured with a number of timing parameters. The bit width of the second field is a non-constant function of a maximum number of the timing parameters configured for one of the N sets of resource blocks (e.g., $\log_2$ (maximum number of the timing parameters for a set of resource blocks)).

In some embodiments the bit width of the field is based on K activated sets of resource blocks of the N set of resource blocks configured for the terminal device, where K is a positive integer greater than 1 and smaller or equal to N.

In some embodiments, the method includes configuring, by the base station, a default set of resource blocks for the terminal device to enable the terminal device to perform another transmission from the terminal device to the base station subsequent to the transmission. That is, the configuration information in the signaling message is only effective for the current transmission, and a default set of resource blocks is used afterwards.

In some embodiments, the method includes transmitting, by the base station, a third signaling message to the terminal device indicating one or more resources in another set of resource blocks of the N sets of resource blocks for another transmission. The one or more resources indicated in the signaling message and the one or more resources indicated in the third signaling message are configured to be non-overlapping in time domain. The method also includes receiving the other transmission from the terminal device using the one or more resources in the other set of resource blocks indicated by the third signaling message.

In some embodiments, the method includes transmitting, by the base station prior to transmitting the signaling message, a third signaling message to the terminal device indicating one or more resources in another set of resource blocks of the N sets of resource blocks for another transmission from the terminal device to the base station. The one or more resources indicated in the signaling message and the one or more resources indicated in the third signaling message are configured to be overlapping in time domain. The method also includes receiving, by the base station, information of the transmission and the other transmission multiplexed based on an index of the set of resource blocks indicated by the signaling message (e.g., the later received signaling message).

In some embodiments, the signaling message includes the field indicating one or more resources for the set of resource blocks in response to a different field included in the signal message indicating the set of resource blocks configured for the transmission from the terminal device to the base station.

Some examples of the disclosed techniques are further described in the following example embodiment. The examples described here focus more on the HARQ-ACK transmission on the PUCCH, but the disclosed techniques can be similarly applied to BWP-based scheduling and retransmissions in either downlink or uplink direction.

Embodiment 1

To enable carrier switching for the UE, the base station can dynamically indicate which carrier the UE should use (e.g., other than the carrier of the primary cell) for HARQ-ACK transmissions and/or retransmissions in the uplink/downlink directions. In some embodiments, the base station can indicate the carrier information in a Downlink Control Information (DCI) signaling. In some embodiments, a field can be added in the DCI to indicate the carrier for transmitting PUCCH HARQ-ACK. In some embodiments, the uplink carrier is jointly indicated in the DCI signaling with the uplink resources for transmitting the HARQ-ACK information. The DCI signaling also includes a parameter k1 that indicates the time interval between the PDSCH transmission and the HARQ-ACK reporting of the PDSCH.

Taking the DCI format 1_1 as an example, when the uplink carrier is jointly indicated with the uplink resources for the HARQ-ACK information, the number of bits in the PUCCH Resource Indicator (PRI) field can change based on the number of carriers configured for the PUCCH HARQ-ACK transmission. For example, if N carriers are configured for the UE (e.g., the UE is allowed to switch between n PUCCH carriers), the number of bits in the PRI field is determined based on the number of carriers switched by PUCCH. In some implementations, the number of bits is equal to ceil(log$_2$(N)).

In some embodiments, to reduce the signaling overhead of the PRI field, inactive carriers can be excluded from the N carriers. That is, the number of bits in the PRI field is determined by the number of activated carriers in the N carriers. For example, among the N configured carriers for the PUCCH HARQ-ACK transmission, M carriers are activated. The number of bits in the PRI field is equal to ceil(log$_2$(M)).

The DCI signaling also carries a timing parameter k1 to indicate the time-domain offset for transmitting the PUCCH information from the reception of the PDSCH transmission. Given multiple configured carriers for the PUCCH HARQ-ACK transmission, a set of k1 values can be assigned to the carriers. In some embodiments, the number of bits for the k1 field in the DCI signaling can be based on the number of values in the set of k1 values corresponding to the configured carriers. For example, a first carrier is configured with a first set of k1 that includes 2 values. A second carrier is configured with a second set of k1 that includes 4 values. In some embodiments, the number of bits for the k1 field in the DCI signaling can be based on a maximum number of k1 values in the set of k1 values (e.g., 4). In some implementations, the number of bits is equal to ceil(log$_2$(w)), where w represents the maximum number of k1 values in a set configured for a carrier. To reduce the signaling overhead of the PRI field, k1 values that correspond to inactive carriers can be excluded for the purpose of signaling. For example, the maximum number of k1 values in a set corresponding to one of the M activated carriers is $w_{Activated}$. Correspondingly, the number of bits for the k1 field in the DCI signaling is equal to ceil(log$_2$($w_{Activated}$)).

The number of bits for the PRI field and the k1 field can be determined differently for different DCI formats. For example, for DCI format 1_2, the number of bits of the PRI filed is determined by the configuration of the base station. That is, the base station sends another signaling message (e.g., RRC signaling) to configure the number of bits in the PRI field. Upon receiving the configuration, the UE determines the uplink resources for different carriers according to a predetermined rule. For example, in some implementations, the PUCCH resources for the primary carrier can be no greater than 32, while the PUCCH resources for the secondary carriers can be no greater than 8. If the base station indicates that the number of bits of the PRI field is m, the predetermined rule can specifies that the number of PUCCH resources for the primary carrier is no greater than $2^{(m+2)}$ while the number of PUCCH resources for other carriers is no more than $2^m$. In some embodiments, the predetermined rule can specify that only the first $2^{(m+2)}$ resources on the primary carrier can be used for PUCCH transmission, and only the first $2^m$ resources on the secondary carriers can be sued for PUCCH transmissions.

For DCI format 1_2, the number of bits of the k1 field is also determined by the configuration of the base station. The base station can indicate the number of bits of the k1 field in the same signaling message (e.g., RRC signaling) as the one for indicating the number of bits of the PRI fields. Upon receiving the configuration, the UE determines the k1 values for different carriers according to a predetermined rule. For example, if the base station indicates that the number of bits of the k1 field is b, the predetermined rule can specify that the number of k1 values is no greater than $2^b$. In some embodiments, the predetermined rule can specify that only the first $2^b$ k1 values can be used for PUCCH transmission.

To reduce the signaling overhead of the PRI field and k1 field for DCI format 1_2, inactive carriers can also be excluded. That is, the indicated number of bits of the PRI field and/or the k1 filed corresponds to activated carriers only.

In some embodiments, the dynamic indication from the base station is only valid for the current PUCCH transmission. After performing the PUCCH transmission according to the configuration indicated in the signaling, the UE proceeds to use a default carrier for subsequent PUCCH transmissions unless instructed otherwise. The default carrier can be a reference carrier that is determined according to the subcarrier spacing (SCS) of the carrier. Details about the reference carrier is further described in Embodiment 5. In some embodiments, the dynamic indication from the base station is valid for the current and subsequent PUCCH transmissions until it receives different configurations from the base station.

In some embodiments, the base station dynamically indicates the carrier configuration for PUCCH transmissions per carrier. For example, for a particular carrier (e.g., CC1), the base station configures a carrier set corresponding to CC1 that can allow carrier switching for the UE for PUCCH transmissions. That is, the UE receives a PDSCH transmission on CC1, and one of the carriers in the configured carrier set can be used to transmit the HAQR-ACK information corresponding to the PDSCH transmission.

In some embodiments, if the UE is configured with multiple carriers for PUCCH transmissions, the UE is configured with resources in different carriers that do not overlap in time domain.

In some embodiments, the UE can be configured with resources in different carriers that overlap in time domain. The HARQ-ACK information on these different carriers can be multiplexed in one transmission on a PUCCH carrier, which is determined based on information indicated in the last DCI signaling corresponding to the HARQ-ACKs. For example, HARQ-ACK information in the different PUCCH carriers can be concatenated in an ascending or descending order based on the index of the serving carrier (or the index of the PUCCH carrier in the CC set).

Once configured with the PUCCH carriers, the uplink resources, and/or the timing parameters, the UE needs to determine a codebook for the HARQ-ACK information. Because multiple carriers or multiple carrier sets can be configured for the HARQ-ACK PUCCH transmission, the codebook can be constructed based on the configured carrier(s).

FIG. 3A is a flowchart representation of a method for wireless communication in accordance with one or more embodiments of the present technology. The method 300 includes, at operation 310, receiving, by a terminal device, a signaling message from the base station indicating one or more sets of resource blocks from N sets of resource blocks configured for a transmission from the terminal device to the base station. Each set of resource blocks corresponds to a carrier or a bandwidth part, and N is a positive integer greater than 1. The method 300 includes, at operation 320, determining a codebook for a feedback information based on the one or more sets of resource blocks. The method also includes, at operation 320, transmitting the codebook on the one or more sets of resource blocks.

In some embodiments, one set of the one or more sets of resource blocks configured for the transmission from the terminal device to the base station (e.g., PUCCH) corresponds to a second set of resource blocks for another transmission from the base station to the terminal (e.g., PDSCH). The determining of the codebook for the feedback information includes, in response to the codebook being configured to be transmitted on the set of the resource blocks, constructing the codebook based on the second set of resource blocks for the other transmission from the base station to the terminal.

In some embodiments, the one or more sets of resource blocks includes a carrier of a secondary cell that is different than a carrier of a primary cell. The codebook is determined by treating the carrier of the secondary cell as the carrier of the primary cell. In some embodiments, the one or more sets of resource blocks are configured as a group for the transmission from the terminal device to the base station.

In some embodiments, the codebook includes non-acknowledgement information corresponding to feedback information indicated to be transmitted in a first set of resource blocks in response to the codebook being transmitted in a second set of resource blocks that is different than the first set. In some embodiments, the codebook includes non-acknowledgement information for one of the slots of a transmission from the base station to the terminal device that the feedback information corresponds to.

In some embodiments, the codebook is determined further based on a downlink assignment index included in the signaling message. In some embodiments, the signaling message indicates different feedback information to be transmitted in a first set of resource blocks and a second set of resource blocks for the transmission from the terminal device to the base station. The codebook for the feedback information is determined based on the downlink assignment index notwithstanding the second set of resource blocks being different than the first set of resource blocks. In some embodiments, the signaling message indicates different feedback information to be transmitted in a first set of resource blocks and a second set of resource blocks for the transmission from the terminal device to the base station. The determining of the codebook for the feedback information includes determining a first codebook for the feedback information configured to be transmitted on the first set of resource blocks, and determining a second codebook for the feedback information configured to be transmitted on the second set of resource blocks.

Figure 3B:
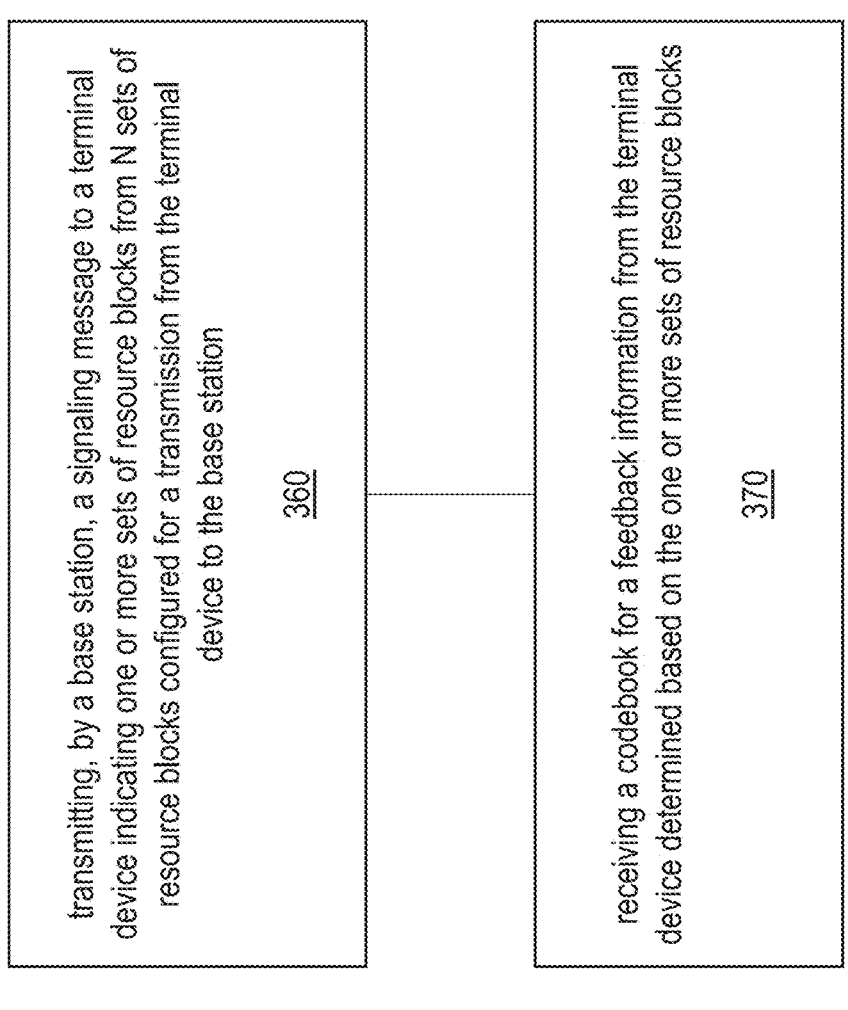
FIG. 3B is a flowchart representation of another method for wireless communication in accordance with one or more embodiments of the present technology.

FIG. 3B is a flowchart representation of a method for wireless communication in accordance with one or more embodiments of the present technology. The method 350 includes, at operation 360, transmitting, by a base station, a signaling message to a terminal device indicating one or more sets of resource blocks from N sets of resource blocks configured for a transmission from the terminal device to the base station. Each set of resource blocks corresponds to a carrier or a bandwidth part, and N is a positive integer greater than 1. The method 350 includes, at operation 370, receiving a codebook for a feedback information from the terminal device. The codebook is determined based on the one or more sets of resource blocks.

In some embodiments, one set of the one or more sets of resource blocks configured for the transmission from the terminal device to the base station (e.g., PUCCH) corresponds to a second set of resource blocks for another transmission from the base station to the terminal (e.g., PDSCH). The codebook for the feedback information is determined, in response to the codebook being configured to be transmitted on the set of the resource blocks, based on the second set of resource blocks for the other transmission from the base station to the terminal.

In some embodiments, the one or more sets of resource blocks includes a carrier of a secondary cell that is different than a carrier of a primary cell, and the codebook is determined by treating the carrier of the secondary cell as the carrier of the primary cell. In some embodiments, the one or more sets of resource blocks are configured as a group for the transmission from the terminal device to the base station.

In some embodiments, the codebook includes non-acknowledgement information corresponding to feedback information indicated to be transmitted in the first set of resource blocks in response to the codebook being transmitted in a second set of resource blocks that is different than the first set. In some embodiments, the codebook includes non-acknowledgement information for one of the slots of a transmission from the base station to the terminal device that the feedback information corresponds to.

In some embodiments, the codebook is determined further based on a downlink assignment index included in the signaling message. In some embodiments, the signaling message indicates different feedback information to be transmitted in a first set of resource blocks and a second set of resource blocks for the transmission from the terminal device to the base station. The codebook for the feedback information is determined based on the downlink assignment index notwithstanding the second set of resource blocks being different than the first set of resource blocks. In some embodiments, the signaling message indicates different feedback information to be transmitted in a first set of resource blocks and a second set of resource blocks for the transmission from the terminal device to the base station. A first codebook is determined for the feedback information configured to be transmitted on the first set of resource blocks, and a second codebook is determined for the feedback information configured to be transmitted on the second set of resource blocks.

Some examples of the disclosed techniques are further described in the following example embodiments.

Embodiment 2

In the existing technology, the transmission of the HARQ-ACK information is restricted to be the primary uplink carrier regardless how many downlink carriers are configured for PDSCH transmissions, so the type-1 codebook generation of HARQ-ACK information is independent from the carrier. When the UE is allowed to switch between uplink carriers for HARQ-ACK PUCCH transmissions, more than one uplink carrier (e.g., SCell uplink carriers) can be used. Thus, the codebook can be constructed based on the uplink carrier (e.g., PCell or SCell) for transmitting the codebook.

In some embodiments, if the UE receives an indication from the base station that the PUCCH transmission can be performed on a secondary carrier CC1, the UE treats this non-primary carrier as a virtual primary carrier and other carriers (including the actual primary carrier CC0) as secondary carriers. The UE then constructs the type-1 codebook based on attributes of this virtual primary carrier CC1 (e.g., the subcarrier spacing and the k1 values configured for CC1). For example, according to the subcarrier spacing of the virtual uplink primary carrier CC1 and the corresponding k1 set, the UE calculates slots used to construct the HARQ-ACK type1 codebook. The UE determines a PUCCH carrier based on the PRI in the DCI signaling corresponding to the HARQ-ACKs indicated in the slot n in the PUCCH carrier. The UE then transmits the HARQ-ACK type1 codebook in the PUCCH carrier (here it is CC1).

In some embodiments, one or more carriers are configured as a carrier group or a carrier set. The base station can configure a carrier group comprising one or more carriers on which a PUCCH transmission can be performed. The type-1 codebook for the HARQ-ACK information can be constructed based on the carrier group (which can have similar attributes), instead of individual carriers in the group, thereby reducing the number of carriers involved in the construction of the type-1 codebook and the overhead of transmitting the type-1 codebook. In some embodiments, a large-size type-1 codebook can be split into multiple smaller codebooks, each corresponding to a carrier group/set. Each codebook can be transmitted further due to its smaller size, making it more suitable for UEs positioned at the edge of the cell.

Based on the type-1 codebook construction mechanism, the type-1 codebook can include HARQ-ACK information corresponding to different PDSCHs, with some of it scheduled to be transmitted in one carrier (e.g., CC0) and some of it scheduled to be transmitted in different carriers (e.g., CC1). For a codebook that is transmitted on a particular carrier (e.g., CC1), the UE can set the HARQ-ACK information for other carriers (e.g., CC0) to NACK.

For example, the UE is initially configured to transmit the HARQ-ACK information corresponding to a PDSCH on a first carrier CC0. The UE then receives a signaling message from the base station indicating that transmission of the HARQ-ACK information is switched to a second carrier CC1 (e.g., an uplink secondary carrier). Based on the conventional type-1 codebook construction mechanism, the type-1 cookbook includes the HARQ-ACK information on CC0. To enable carrier switching from CC0 to CC1, NACK information can be inserted in the codebook for HARQ-ACK information on CC0.

In some embodiments, a PDSCH transmission is performed in slot n on CC0. The slots used to construct the type-1 codebook include the slot n for the PDSCH transmission. However, transmission of the HARQ-ACK information corresponding to the PDSCH transmission in slot n is indicated to be switched to from CC0 to CC1. The HARQ-ACK information corresponding to the PDSCH is then set to NACK in the type-1 codebook.

On the base station side, because the base station schedules the carrier switching for HARQ-ACK PUCCH transmission, the base station is aware of the NACK information corresponding to CC0, so the decoding performance for decoding the codebook can be improved.

Embodiment 3

Type-2 codebook construction is based on the Downlink Assignment Index included in the DCI signaling. Conventionally, only the uplink PCells are allowed to transmit HARQ-ACKs corresponding to the same type 2 codebook. It is also required that the DAI values in the DCI corresponding to these HARQ-ACKs are continuous, and these HARQ-ACKs are scheduled to be transmitted in the same slot. However, if the UE supports HARQ-ACK PUCCH carrier switching, then for HARQ-ACKs corresponding to the same type 2 codebook, an additional requirement can be introduced that these HARQ-ACKs are scheduled to be transmitted on the same PUCCH carrier.

In some embodiments, the same type-2 codebook can be constructed for transmission over different carriers. For example, the UE receives DCI signaling messages to schedule PDSCH transmissions. For type-2 codebook construction, the UE can rely on the DAI in the DCI signaling messages to construct the type-2 codebook regardless of whether the HARQ-ACK information corresponding to the PDSCH is transmitted in the same or different carriers. For example, the UE can ignore the indication in the DCI that indicating the PUCCH carrier(s) for transmitting the HARQ-ACK information.

In some embodiments, the UE receives DCI signaling messages to schedule PDSCH transmissions. The UE determines that there are continuous DAI assignments in the DCI signaling message. For type-2 codebook construction, the UE can rely on the DAI in the DCI signaling messages to construct the type-2 codebook regardless of whether the HARQ-ACK information corresponding to the PDSCH is transmitted in the same or different carriers. For example, a type2 codebook includes 4 bits of HARQ-ACK information. The PUCCH corresponding to the 4 bits of HARQ-ACK information can be scheduled to be transmitted in different CCs, as long as the DAI in the DCIs corresponding to the 4 bits of HARQ-ACK information is continuous. That is, the type-2 codebook is no longer limited to be in the same carriers, thereby improving the flexibility of type-2 codebook construction.

In some embodiments, different type-2 codebooks are constructed for transmission over different carriers. For example, if the UE is configured with PUCCH carrier switching, only the HARQ-ACKs that is indicated to be transmitted in the same carrier and/or the same slot are allowed to be constructed in the same type2 codebook. That is, if the base station wants a type-2 codebook to include multiple HARQ-ACKs, these HARQ-ACKs need to be configured in the same carrier and/or same slot for transmission. Furthermore, in some embodiments, the DAI values for the PDSCH corresponding to the HARQ-ACKs need to be continuous.

For example, the base station configures HARQ-ACK1 of PDSCH1 to be transmitted in slot n of PUCCH carrier 1, and also configures HARQ-ACK2 of PDSCH2 to be transmitted in slot n of PUCCH carrier 1. The base station configures DAI values in the DCI corresponding to HARQ-ACK1 and HARQ-ACK2 to be continuous. In this way, if the UE receives the DCIs in the PDCCH, the UE knows that the DAI values corresponding to HARQ-ACK1 and HARQ-ACK2 are continuous, and that HARQ-ACK1 and HARQ-ACK2 are scheduled to be transmit in the same PUCCH carrier 1 and the same slot. The UE then constructs HARQ-ACK1 and HARQ-ACK2 into the same type-2 codebook.

As another example, the base station configures HARQ-ACK1 of PDSCH1 scheduled to be transmitted in slot n of PUCCH carrier 1, but configures HARQ-ACK2 of PDSCH2 scheduled to be transmitted in slot n of PUCCH carrier 0. Even if the base station configures DAI values in the DCI corresponding to HARQ-ACK1 and HARQ-ACK2 to be continuous, HARQ-ACK1 and HARQ-ACK2 are scheduled to be transmitted in the different PUCCH carrier 1. The UE then constructs separate type-2 codebooks to for HARQ-ACK1 and HARQ-ACK2. Separate type-2 codebook generation for different carriers can lead to simpler construction mechanism in which the HARQ-ACKs with the same attributes (e.g., same low-frequency or high-frequency carrier) can be grouped together and HARQ-ACKs with different attributes can be divided.

One of the most outstanding differences in 5G/NR communication technology is the support for multiple types of subcarrier spacing. Different subcarrier spacing values lead to different slot lengths, thus determining the slot position in time-domain becomes problematic when there is a switch between carriers that may have different subcarrier spacing values.

FIG. 4A is a flowchart representation of a method for wireless communication in accordance with one or more embodiments of the present technology. The method 400 includes, at operation 410, receiving, by a terminal device, a first transmission from a base station. The method 400 also includes, at operation 420, determining, by the terminal device, a slot position of a reference set of frequency blocks based on the first transmission and a timing parameter for a second transmission from the terminal device to the base station. A set of frequency blocks corresponds to a carrier or a bandwidth part. The method 400 includes, at operation 430, determining, by the terminal device based on the slot position of the reference set of frequency blocks, a first set of frequency blocks and a slot position of the first set of frequency blocks for the second transmission. The method also includes, at operation 440, performing, by the terminal device, the second transmission at the slot position of the first set of frequency blocks.

In some embodiments, the terminal device is configured with multiple sets of frequency blocks for the second transmission, and a subcarrier spacing value of at least one of the multiple sets of frequency blocks is different than subcarrier spacing values of remaining sets of frequency blocks. In some embodiments, the terminal device is configured with multiple sets of frequency blocks for the second transmission. Each of the multiple sets of frequency blocks is configured with a slot configuration comprising at least an uplink slot, and the determining of the first set of frequency blocks includes determining the first set of frequency blocks based on the slot position of the reference set of frequency blocks and the slot configurations of the multiple sets of frequency blocks. The first set of frequency blocks can also be determined based on the slot position of the reference set of frequency blocks and the configuration information for configuring the first set of frequency blocks from the multiple sets of frequency blocks in the duration of the slot position of the reference set of frequency blocks, or based on the configuration information for configuring the first set of frequency blocks from the multiple sets of frequency blocks in the duration of the slot position of the reference set of frequency blocks.

In some embodiments, the reference set of frequency blocks is preconfigured or indicated by the base station. In some embodiments, the reference set of frequency blocks includes one of: a carrier or a bandwidth part in which transmission from the base station to the terminal device are performed, a carrier or a bandwidth part for transmissions from the terminal device to the base station in a primary cell, a carrier or a bandwidth part having a smallest subcarrier spacing value among multiple carriers or bandwidth parts, or a carrier or a bandwidth part having a largest subcarrier spacing value among multiple carriers or bandwidth parts. In some embodiments, the first set of frequency blocks is a default set of frequency blocks for performing the transmission, and the default set of frequency blocks is one of: a carrier or a bandwidth part for transmissions from the terminal device to the base station in a primary cell, a carrier or a bandwidth part having a smallest or largest subcarrier spacing value among multiple carriers or bandwidth parts, or a carrier or a bandwidth part having a smallest or largest index.

In some embodiments, the slot position of the reference set of frequency blocks corresponds to multiple slots in the first set of frequency blocks, and the slot position of the first set of frequency blocks is further determined based on per slot configuration information for the first set of frequency blocks included in the signaling message. In some embodiments, the signaling message includes a bitmap indicating one or more slots of at least one set of frequency blocks of the multiple sets of frequency blocks that are available for the transmission from the terminal device to the base station.

FIG. 4B is a flowchart representation of a method for wireless communication in accordance with one or more embodiments of the present technology. The method 450 includes, at operation 460, performing, by a base station, a first transmission to the terminal. The method 450 includes, at operation 470, receiving, by the base station, a second transmission at a slot position of a first set of frequency blocks. The first set of frequency blocks and the slot position of the first set of frequency blocks are determined based on a slot position of a reference set of frequency blocks that is determined based on the first transmission and a timing parameter for the second transmission from the terminal device to the base station. A set of frequency blocks corresponds to a carrier or a bandwidth part.

In some embodiments, multiple sets of frequency blocks are configured for the second transmission, and a subcarrier spacing value of at least one of the multiple sets of frequency blocks is different than subcarrier spacing values of remaining sets of frequency blocks. In some embodiments, multiple sets of frequency blocks are configured for the second transmission and each of the multiple sets of frequency blocks is configured with a slot configuration comprising at least a downlink slot or an uplink slot. The first set of frequency blocks is determined based on the slot position of the reference set of frequency blocks and the slot configurations of the multiple sets of frequency blocks. The first set of frequency blocks can also be determined based on the slot position of the reference set of frequency blocks and the configuration information for configuring the first set of frequency blocks from the multiple sets of frequency blocks in the duration of the slot position of the reference set of frequency blocks, or based on the configuration information for configuring the first set of frequency blocks from the multiple sets of frequency blocks in the duration of the slot position of the reference set of frequency blocks.

In some embodiments, the method includes transmitting, by the base station, a second signaling message prior to the signaling message to configure the reference set of frequency blocks. In some embodiments, the reference set of frequency blocks includes one of: a carrier or a bandwidth part in which transmission from the base station to the terminal device are performed, a carrier or a bandwidth part for transmissions from the terminal device to the base station in a primary cell, a carrier or a bandwidth part having a smallest subcarrier spacing value among multiple carriers or bandwidth parts, or a carrier or a bandwidth part having a largest subcarrier spacing value among multiple carriers or bandwidth parts. In some embodiments, the first set of frequency blocks is a default set of frequency blocks for performing the transmission, and the default set of frequency blocks is one of: a carrier or a bandwidth part for transmissions from the terminal device to the base station in a primary cell, a carrier or a bandwidth part having a smallest or largest subcarrier spacing value among multiple carriers or bandwidth parts, or a carrier or a bandwidth part having a smallest or largest index.

In some embodiments, the slot position of the reference set of frequency blocks corresponds to multiple slots in the first set of frequency blocks, and the slot position of the first set of frequency blocks is further determined based on per slot configuration information for the first set of frequency blocks included in the signaling message. In some embodiments, the signaling message includes a bitmap indicating one or more slots of at least one set of frequency blocks of the multiple sets of frequency blocks that are available for the transmission from the terminal device to the base station.

Some examples of the disclosed techniques are further described in the following example embodiment. The examples described here focus more on the HARQ-ACK transmission on the PUCCH, but the disclosed techniques can be similarly applied to BWP-based scheduling and retransmissions in either downlink or uplink direction.

Embodiment 4

In some embodiments, the configuration information from the base station to the UE can carry a signaling structure (X, Y) indicating the carrier that the UE should switch to and the starting slot position for the switch. The configuration information can be transmitted in the physical layer (e.g., in the DCI signaling), in the Medium Access Control (MAC) layer (e.g., in the Control Element), or in the RRC layer.

In some embodiments, the signaling structure (X, Y) is configured in a downlink slot. For example, the base station includes (A1, B1) in the configuration information sent to the UE. A1 indicates the PUCCH carrier and B1 indicates the starting slot position or an interval based on slot. In some embodiments, A1 is the carrier index in a carrier set or the serving cell index for the carrier for performing the PUCCH transmission. The UE receives a PDSCH or PDCCH from the base station, and the end of the received PDSCH or PDCCH is in slot t in carrier CC0. Based on slot t in CC0, the UE can determine one or more slots in CC1 that overlap with slot t in the time domain (e.g., via A1 that indicates CC1 or via a predetermined relationship between CC1 and CC0 indicated by A1), and then determine that the last slot in the one or more slots is the slot n. The UE then determine the starting slot position to be slot(n+B1) for transmitting the HARQ-ACK corresponding to the PDSCH or PDCCH in CC1. In some embodiments, the slot n and the slot t can be the same slot and/or be on the same carrier if CC0 is indicated as PUCCH carrier by A1. In some embodiments, B1 is represented in units of slots. In some embodiments, B1 is represented in other time units (e.g., ms). In some embodiments, B1 is counted according to the slot of the carrier indicated by A1.

In some embodiments, the base station includes (A2, B2) in the configuration information sent to the UE. A2 indicates the PUCCH carrier and B2 indicates the starting slot position or an interval based on slot. In some embodiments, A2 is the carrier index in a carrier set or the serving cell index for the carrier for performing the PUCCH transmission. The UE receives a PDSCH or PDCCH from the base station, and the end of the received PDSCH or PDCCH is in the Orthogonal Frequency-Division Multiplexing (OFDM) symbol set t in carrier CC0. Based on the symbol set t position in CC0, the UE can determine one or more slots in CC1 that overlap with the symbol set t in the time domain (e.g., via A2 that indicates CC1 or via a predetermined relationship between CC1 and CC0 indicated by A2), and then determine that the last slot in the one or more slots is the slot n. The UE then determine the starting slot position to be slot(n+B2) for transmitting the HARQ-ACK corresponding to the PDSCH or PDCCH in CC1. In some embodiments, the slot n and the slot t can be the same slot and/or be on the same carrier if CC0 is indicated as PUCCH carrier by A2. In some embodiments, B2 is represented in units of slots. In some embodiments, B2 is represented in other time units (e.g., ms). In some embodiments, B2 is counted according to the slot of the carrier indicated by A2.

Figure 5:
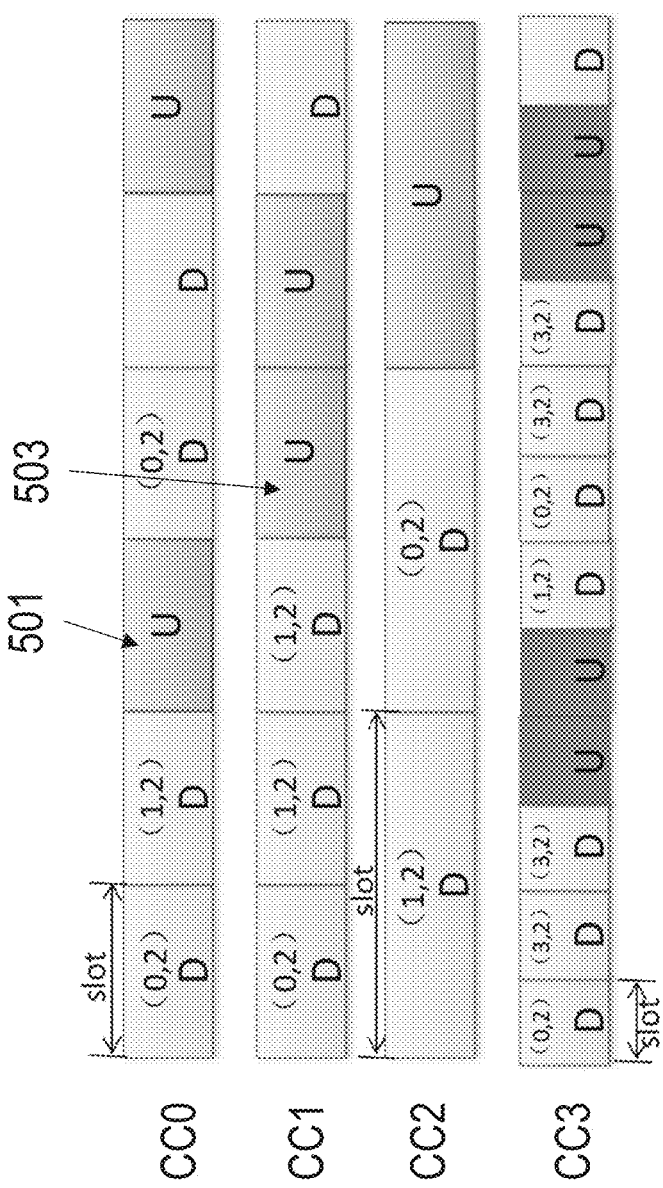
FIG. 5 illustrates examples of configuration information for a User Equipment (UE) that is configured with four PUCCH carriers in accordance with one or more embodiments of the present technology.

FIG. 5 illustrates examples of configuration information for a UE that is configured with four PUCCH carriers in accordance with one or more embodiments of the present technology. Among the four carriers, the primary cell carrier is assigned to index 0 (CC0) and the secondary cell carriers are assigned to indices 1 to 3 (CC1-CC3). For the downlink transmission received in the first slot in CC0, CC1, and CC3, the UE receives an (A1, B1) signaling structure of value (0, 2), which indicates that the HARQ-ACK corresponding to the received PDSCH or PDCCH is transmitted on a carrier having an index of 0, with an offset of 2 slots. The UE then determines that slot 501 is the starting slot of carrier index 0 for the HAQR-ACK transmission. For the downlink transmission received in the second slot in cell 0, cell 1 and the first slot in cell 2, the UE receives an (A1, B1) signaling of value (1, 2), indicating that the HARQ-ACK corresponding to the received PDSCH or PDCCH is transmitted on a carrier having an index of 1, with an offset of 2 slots in the time domain. The UE then decides that slot 503 is the starting slot of carrier index 1 for the HAQR-ACK transmission.

In some embodiments, the (Ai, Bi) structure is configured periodically, where i is a positive integer (e.g., 1, 2). The period length can be in units of frames, subframes, or according to the period of periodic RRC configuration. The (Ai, Bi) signaling structure can be configured per carrier or per BWP for downlink slot. Different UEs configured with the same carriers/BWPs can share the same (Ai, Bi) structure, thereby reducing signaling overhead. The (Ai, Bi) structure can also be configured as UE specific so that each UE can perform carrier switching in different ways, leading to more flexible scheduling for the UEs.

In some embodiments, the value of Ai in the (Ai, Bi) structure is omitted, indicating that the UE should transmit the HARQ-ACK using a default carrier or a reference carrier. In some embodiments, if the carrier indicated by Ai in the (Ai, Bi) structure is deactivated, the UE falls back to the default carrier or the reference carrier to transmit the HARQ-ACK information. For example, the default carrier or the reference carrier can be the carrier that transmits the corresponding PDSCH or PDCCH, the uplink primary cell, the carrier of the smallest or largest subcarrier spacing value, or the carrier having the smallest or largest index. In some embodiments, the value of Bi in the (Ai, Bi) structure is omitted, and the k1 field in the DCI signaling is used as Bi. When Bi are present in the (Ai, Bi) structure, the k1 field in the DCI can be omitted or ignored by the UE. In some embodiments, if the (Ai, Bi) structure is not configured for a downlink slot, the UE should transmit the HARQ-ACK corresponding to a PDSCH or PDCCH (within the downlink slot) in a default carrier or a reference carrier using the k1 value included in the DCI signaling for scheduling the PDSCH or PDCCH. In some embodiments, for a downlink slot configured with (Ai, Bi), if the PUCCH carrier indicated by A is deactivated, the UE can determine that the PUCCH carrier is the default carrier or reference carrier.

In some embodiments, if the UE is configured for PUCCH carrier switching, the same k1 set can be shared between PUCCH carriers. In some embodiments, the carrier used to transmit PDSCH or PDCCH (e.g., CC0) and the carrier(s) used to transmit corresponding HARQ-ACK feedback can be the same (e.g., CC1), such as a Time Division Duplexing (TDD) carrier.

In some embodiments, the signaling structure (X, Y) is configured in an uplink slot. For example, the base station and the UE agree to determine the PUCCH carrier based on a (C1, D1) structure. C1 indicates the PDSCH or PDCCH carrier and D1 indicates an interval based on slot. In some embodiments, C1 is the carrier index in a carrier set or the serving cell index for the carrier in which the PDSCH or PDCCH that needs HARQ-ACK feedback is located. That is, the HARQ-ACK corresponding to the PDSCH or PDCCH in the carrier indicated by C1 is transmitted in a carrier in which an uplink slot is configured with (C1, D1). The UE receives a PDSCH or PDCCH from the base station, and the end of the received PDSCH or PDCCH is in slot t in carrier CC0. Slot n is a slot in the same carrier as the uplink slot that is configured with (C1, D1), and slot n can be the last slot in one or more slots that overlap with slot t in time domain. The UE then determines that the uplink slot configured (C1, D1) is slot(n+D1) in the carrier configured with (C1, D1) for transmitting the HARQ-ACK corresponding to the PDSCH or PDCCH in the carrier CC0 indicated by C1. In some embodiments, the slot n and the slot t can be the same slot and/or be on the same carrier if the carrier transmitting the PDSCH or PDCCH is indicated as the carrier configured with (C1, D1) by C1. In some embodiments, D1 is represented in units of slots. In some embodiments, D1 is represented in other time units (e.g., ms). In some embodiments, D1 is counted according to the slot of the carrier configured with (C1, D1).

In some embodiments, the base station and the UE agree to determine the PUCCH carrier based on a (C2, D2) structure. C2 indicates the PDSCH or PDCCH carrier and D2 indicates an interval based on slot. In some embodiments, C2 is the carrier index in a carrier set or the serving cell index for the carrier in which the PDSCH or PDCCH that needs HARQ-ACK feedback is located. That is, the HARQ-ACK corresponding to the PDSCH or PDCCH in the carrier indicated by C2 is transmitted using a carrier in which an uplink slot is configured with (C2, D2). The UE receives a PDSCH or PDCCH from the base station, and the end of the received PDSCH or PDCCH is in the OFDM symbol set t in carrier CC0. Slot n is a slot in the same carrier as the uplink slot that is configured with (C2, D2), and slot n can be the last slot in one or more slots that overlap with the OFDM set t in time domain. The UE then determines that the uplink slot configured (C2, D2) is slot(n+D2) in the carrier configured with (C2, D2) for transmitting the HARQ-ACK corresponding to the PDSCH or PDCCH in the carrier CC0 indicated by C2. In some embodiments, the slot n and the slot t can be the same slot and/or be on the same carrier if the carrier transmitting the PDSCH or PDCCH is indicated as the carrier configured with (C2, D2) by C2. In some embodiments, D2 is represented in units of slots. In some embodiments, D2 is represented in other time units (e.g., ms). In some embodiments, D2 is counted according to the slot of the carrier configured with (C2, D2).

In some embodiments, the (Ci, Di) structure is configured periodically, where i is a positive integer (e.g., 1, 2). The period length can be in units of frames, subframes, or according to the period of periodic RRC configuration. The (Ci, Di) signaling structure can be configured per carrier or per BWP for uplink slot. Different UEs configured with the same carriers/BWPs can share the same (Ci, Di) structure, thereby reducing signaling overhead. The (Ci, Di) structure can also be configured as UE specific so that each UE can perform carrier switching in different ways, leading to more flexible scheduling for the UEs.

In some embodiments, an uplink slot can be configured with one or more different (Ci, Di) structures. It facilitates the transmission of HARQ-ACKs of PDSCHs or PDCCHs in multiple CCs or multiple DL slots in the same UL slot.

In some embodiments, the value of Ci in the (Ci, Di) structure is omitted, indicating that the UE should transmit the HARQ-ACK of the PDSCH or PDCCH in the default carrier or the reference carrier in the slot configured (Ci, Di) structure. For example, the default carrier or the reference carrier can be the carrier that transmits the corresponding PDSCH or PDCCH, the uplink primary cell, the carrier of the smallest or largest subcarrier spacing value, or the carrier having the smallest or largest index. In some embodiments, the value of Di in the (Ci, Di) structure is omitted, and the k1 field in the DCI signaling is used as Di. When Di are present in the (Ci, Di) structure, the k1 field in the DCI can be omitted or ignored by the UE. In some embodiments, if the (Ci, Di) structure is not configured for a uplink slot, the UE should transmit the HARQ-ACK corresponding to a PDSCH or PDCCH in a default carrier or a reference carrier using the k1 value included in the DCI signaling for scheduling the PDSCH or PDCCH.

In some embodiments, if the UE is configured for PUCCH carrier switching, the same k1 set can be shared between PUCCH carriers. In some embodiments, the carrier used to transmit PDSCH or PDCCH (e.g., CC0) and the carrier(s) used to transmit corresponding HARQ-ACK feedback can be the same (e.g., CC1), such as a Time Division Duplexing (TDD) carrier.

Embodiment 5

In some embodiments, different carriers for PUSCH retransmissions and/or HARQ-ACK PUCCH transmissions can be configured based on a reference carrier. The following uses PUCCH as an example for description. The same principle can be adapted to PUSCH. The use of the reference carrier can allow the determination of the slot for transmitting PUCCH (or the starting slot position) between carriers having different subcarrier spacing values. The reference carrier can be the carrier that transmits the PDSCH or PDCCH, the uplink primary carrier, a carrier of the smallest or largest subcarrier spacing value, the carrier of the smallest or the largest index, or preconfigured by the base station using a signaling message (e.g., RRC).

Figure 6:
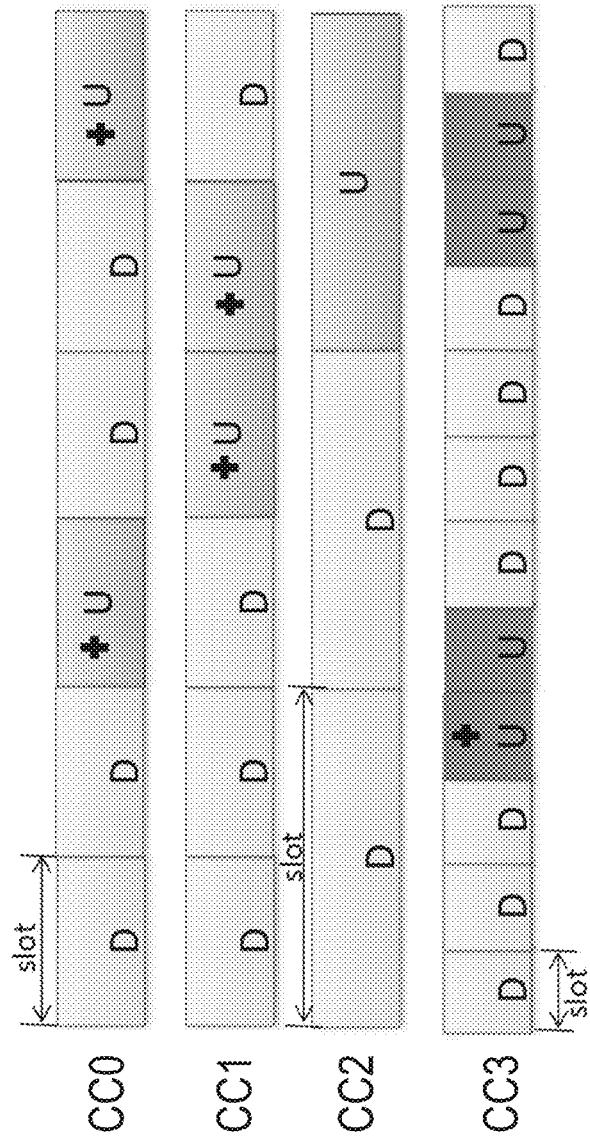
FIG. 6 illustrates additional examples of configuration information for a UE that is configured with four PUCCH carriers in accordance with one or more embodiments of the present technology.

FIG. 6 illustrates additional examples of configuration information for a UE that is configured with four PUCCH carriers in accordance with one or more embodiments of the present technology. Among the four carriers, the primary cell carrier is assigned to index 0 (CC0) and the secondary cell carriers are assigned to indices 1 to 3 (CC1-CC3). The UE is configured with a reference carrier of index 0, which is the uplink primary carrier. The UE is also configured with different slot configurations (e.g., downlink slots, uplink slots, flexible slots, etc.) for different carriers.

For example, a PDSCH or PDCCH transmission is scheduled in the DCI signaling. At the same time, the DCI indicates that the HARQ-ACK PUCCH corresponding to the PDSCH or PDCCH is transmitted in a certain slot of the PUCCH carrier. Specifically, the k1 value in the DCI signaling is used to determine a slot of the reference carrier, and the duration of the slot in time domain can be used to determine the actual carrier and the starting slot for performing the PUCCH. When multiple carriers or multiple slots can be used for PUCCH transmissions during the slot duration, the carrier and/or slot assigned the highest priority is selected (e.g., the earliest slot, the carrier with the smallest or largest index, or the carriers with the smallest or largest subcarrier spacing). It can also be that when multiple carriers or multiple slots can be used for PUCCH transmissions during the slot duration, the carrier and/or slot is configured by a signaling message.

If the UE receives a PDSCH or PDCCH transmission in slot t0 with a corresponding timing parameter k1 configured in the DCI. The UE determines a slot (t0+k1) based on t0 and k1 (e.g., slot T=slot (t0+k1)) in the reference carrier CC0. For the convenience of description, assume that the slot (t0+k1) is the second slot in the reference carrier CC0. During the duration of slot (t0+k1), CC3 has a slot that is suitable for performing PUCCH transmissions based on the slot configurations of different carriers. Thus, the fourth slot of CC3 is marked for PUCCH transmission (e.g., with a "+" sign) for carrier switching. For example, the carriers can be assigned different priorities according to their indices, then PUCCH carrier can be the highest priority; Or during the duration of slot (t0+k1), the base station configures the fourth slot of CC3 as PUCCH transmission (detailed configuration signaling is provided in embodiment 6). In this way, the UE uses the fourth slot of CC3 to transmit PUCCH during the duration of slot (t0+k1) in reference carrier CC0.

If the UE receives a PDSCH or PDCCH transmission in slot t1 and with a corresponding timing parameter k1. The UE determines a slot (t1+k1) based on t0 and k1 (e.g., slot T=slot (t1+k1)) in the reference carrier CC0. For the convenience of description, assume that the slot (t1+k1) is the third slot in the reference carrier CC0. During the duration of slot (t1+k1), CC0 has a slot that is suitable for performing PUCCH transmissions. CC3 also has an uplink slot that can be used for PUCCH transmissions. The carriers can be assigned different priorities according to their indices, then PUCCH carrier can be the highest priority; For example, the carriers can be assigned different priorities according to their indices, then PUCCH carrier can be the highest priority; Thus, the third slot of CC0 is marked for PUCCH transmission (e.g., with a "+" sign) for carrier switching. Or, during the duration of slot (t1+k1), the base station configures the fourth slot of CC3 as PUCCH transmission (detailed configuration signaling is provided in embodiment 6). Thus, the third slot of CC0 is marked for PUCCH transmission (e.g., with a "+" sign) for carrier switching. In this way, the UE uses the third slot of CC0 to transmit PUCCH during the duration of slot (t1+k1) in reference carrier CC0.

If the UE receives a PDSCH or PDCCH transmission in slot t2 and with a corresponding timing parameter k1. The UE determines a slot (t2+k1) based on t0 and k1 (e.g., slot T=slot (t2+k1)) in the reference carrier CC0. For the convenience of description, assume that the slot (t2+k1) is the fourth slot in the reference carrier CC0. During the duration of slot (t2+k1), CC1 has a slot that is suitable for performing PUCCH transmissions based on the slot configurations of different carriers. Thus, the fourth slot of CC1 is marked for PUCCH transmission (e.g., with a "+" sign) for carrier switching. For example, the carriers can be assigned different priorities according to their indices, then PUCCH carrier can be the highest priority; Or during the duration of slot (t2+k1), the base station configures the fourth slot of CC1 as PUCCH transmission (detailed configuration signaling is provided in embodiment 6). In this way, the UE uses the fourth slot of CC1 to transmit PUCCH during the duration of slot (t2+k1) in reference carrier CC0.

If the UE receives a PDSCH or PDCCH transmission in slot t3 and with a corresponding timing parameter k1. The UE determines a slot (t3+k1) based on t0 and k1 (e.g., slot T=slot (t3+k1)) in the reference carrier CC0. For the convenience of description, assume that the slot (t3+k1) is the fifth slot in the reference carrier CC0. During the duration of slot (t3+k1), CC1 has a slot that is suitable for performing PUCCH transmissions. CC2 and CC3 also have a slot that can be used for PUCCH transmission. The carriers can be assigned different priorities according to their indices, then PUCCH carrier can be the highest priority; For example, the carriers can be assigned different priorities according to their indices, then PUCCH carrier can be the highest priority; Given the priority of the carriers (e.g., smaller indices are given higher priorities), the fifth slot of CC1 is marked for PUCCH transmission (e.g., with a "+" sign) for carrier switching. Or, during the duration of slot (t3+k1), the base station configures the fifth slot of CC1 as PUCCH transmission (detailed configuration signaling is provided in embodiment 6). Thus, the fifth slot of CC1 is marked for PUCCH transmission (e.g., with a "+" sign) for carrier switching. In this way, the UE uses the fifth slot of CC1 to transmit PUCCH during the duration of slot (t3+k1) in reference carrier CC0.

If the UE receives a PDSCH or PDCCH transmission in slot t4 and with a corresponding timing parameter k1. The UE determines a slot (t4+k1) based on t0 and k1 (e.g., slot T=slot (t4+k1)) in the reference carrier CC0. For the convenience of description, assume that the slot (t4+k1) is the sixth slot in the reference carrier CC0. During the duration of slot (t4+k1), CC0 has a slot that is suitable for performing PUCCH transmissions. CC2 and CC3 also have a slot that can be used for PUCCH transmission. Because CC0 is assigned higher priority, the fifth slot of CC0 is marked for PUCCH transmission (e.g., with a "+" sign) for carrier switching. Or, during the duration of slot (t4+k1), the base station configures the sixth slot of CC0 as PUCCH transmission (detailed configuration signaling is provided in embodiment 6). Thus, the sixth slot of CC0 is marked for PUCCH transmission (e.g., with a "+" sign) for carrier switching. In this way, the UE uses the sixth slot of CC0 to transmit PUCCH during the duration of slot (t4+k1) in reference carrier CC0.

In some embodiments, if a carrier has multiple uplink slots during the duration of the slot of the reference carrier due to different subcarrier spacing values, per slot configuration can be indicated or predefined to allow the selection of slot for transmitting PUCCH.

In some embodiments, the reference carrier (and/or the per slot configuration) is configured periodically. The period length can be in units of frames, subframes, or according to the period of periodic RRC configuration.

In some embodiments, during the duration of a slot of the reference carrier, if there are two or more carriers that have UL slots at the same time, and if the PUCCH carrier is not configured, the PUCCH carrier can be the reference carrier, the UL Pcell, the carrier with the smallest (or largest) index or the carrier with the smallest (or largest) subcarrier spacing from the two or more carriers.

In some embodiments, during the duration of a slot of the reference carrier, if a PUCCH carrier is not configured, the PUCCH carrier can be the reference carrier, the UL Pcell, the carrier with the smallest (or largest) index or the carrier with the smallest (or largest) subcarrier spacing.

In some embodiments, during the duration of a slot of the reference carrier, if there is only one carrier with UL slot or the carrier with UL slot does not exceed 1 carrier, then the PUCCH carrier may not be configured and the carrier with UL slot is the PUCCH carrier.

Embodiment 6

To further facilitate configuration of carrier switching, a bit map can be used to indicate the PUCCH transmission per carrier for the UE.

Referring back to FIG. 6, a 6-bit bitmap (e.g., 001001) can be used for CC0 to indicate that it includes two uplink slots available for PUCCH transmissions, in which '0' indicates that the slot cannot be used for PUCCH transmissions and '1' indicates that the slot is available for PUCCH transmissions. Similarly, CC1 can use a 6-bit bitmap of 000110 to indicate the available slots. Due to its longer slot length, CC2 can use a 3-bit bitmap (e.g., 000) to indicate the available slot. CC3 needs a 12-bit bitmap (e.g., 000100000000) for the indication of the available uplink slots. In some embodiments, if a subset of the uplink slots is not configured for PUCCH, the bitmap can indicate accordingly. For example, the 12-bit bitmap for CC3 can be 000100000000, indicating that only one slot is available for PUCCH.

In some embodiments, the number of bits needed in the bitmap can be determined based on the number of uplink slots per signaling period, thereby reducing signaling overhead. For example, using a period that is equivalent to 6 slots based on CC0 in FIG. 6, a 2-bit bitmap can be used for CC0 (e.g., 11) and CC1 (e.g., 11), a 1-bit bitmap can be used for CC2 (e.g., 0) given that its third UL slot is not configured to transmit PUCCH, and a 4-bit bitmap can be used for CC3 (e.g., 1000) given that its 5th, 10th, and 11th slots are not configured to transmit PUCCH. The signaling period can be in units of frames, subframes, according to the period of RRC configuration, or be configured otherwise.

Figure 7:
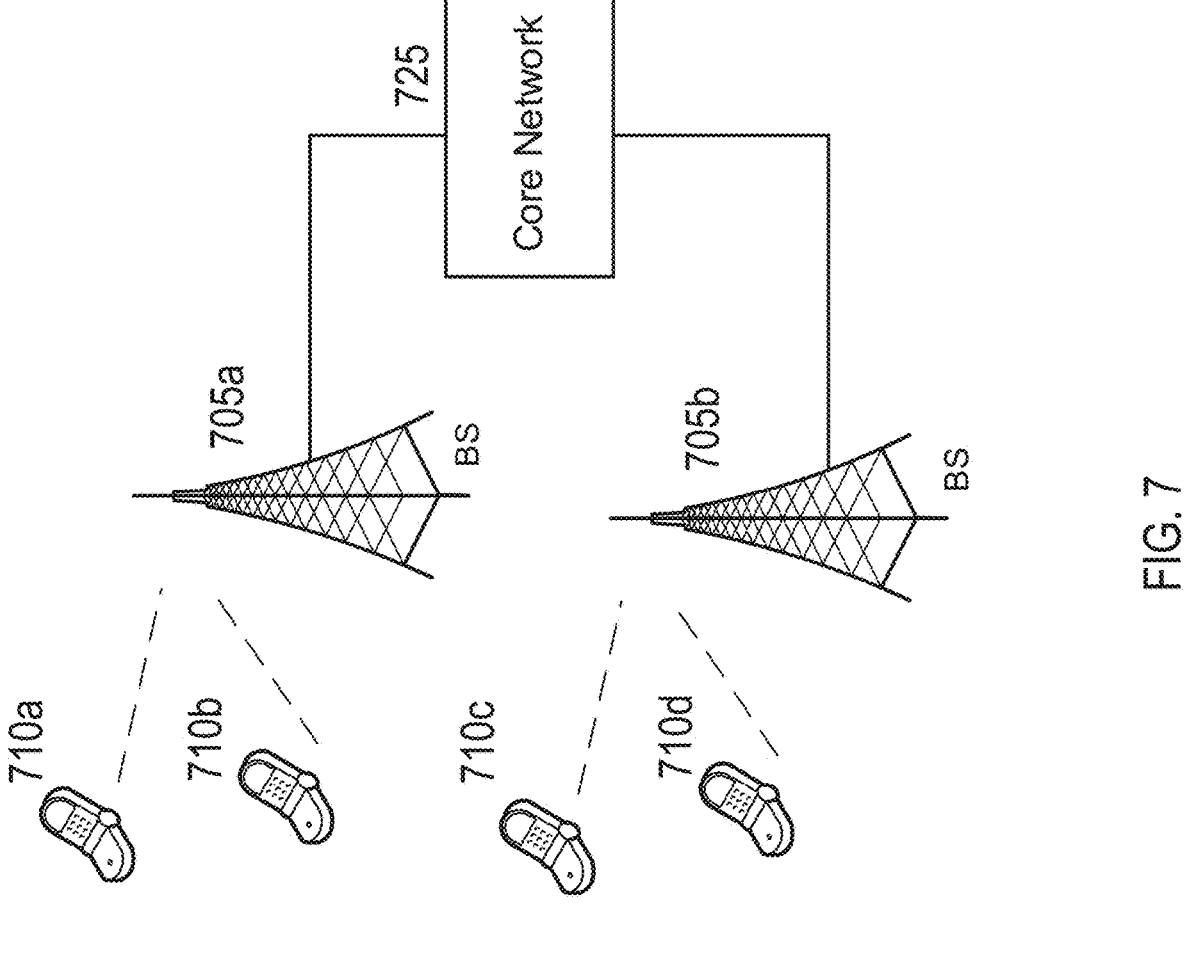
FIG. 7 shows an example of a wireless communication system where techniques in accordance with one or more embodiments of the present technology can be applied.

FIG. 7 shows an example of a wireless communication system 1000 where techniques in accordance with one or more embodiments of the present technology can be applied. A wireless communication system 700 can include one or more base stations (BSs) 705*a*, 705*b*, one or more wireless devices 710*a*, 710*b*, 710*c*, 710*d*, and a core network 725. A base station 705*a*, 705*b* can provide wireless service to wireless devices 710*a*, 710*b*, 710*c* and 710*d* in one or more wireless sectors. In some implementations, a base station 705*a*, 705*b* includes directional antennas to produce two or more directional beams to provide wireless coverage in different sectors.

The core network 725 can communicate with one or more base stations 705*a*, 705*b*. The core network 725 provides connectivity with other wireless communication systems and wired communication systems. The core network may include one or more service subscription databases to store information related to the subscribed wireless devices 710*a*, 710*b*, 710*c*, and 710*d*. A first base station 705*a* can provide wireless service based on a first radio access technology, whereas a second base station 705*b* can provide wireless service based on a second radio access technology. The base stations 705*a* and 705*b* may be co-located or may be separately installed in the field according to the deployment scenario. The wireless devices 710*a*, 710*b*, 710*c*, and 710*d* can support multiple different radio access technologies. The techniques and embodiments described in the present document may be implemented by the base stations of wireless devices described in the present document.

Figure 8:
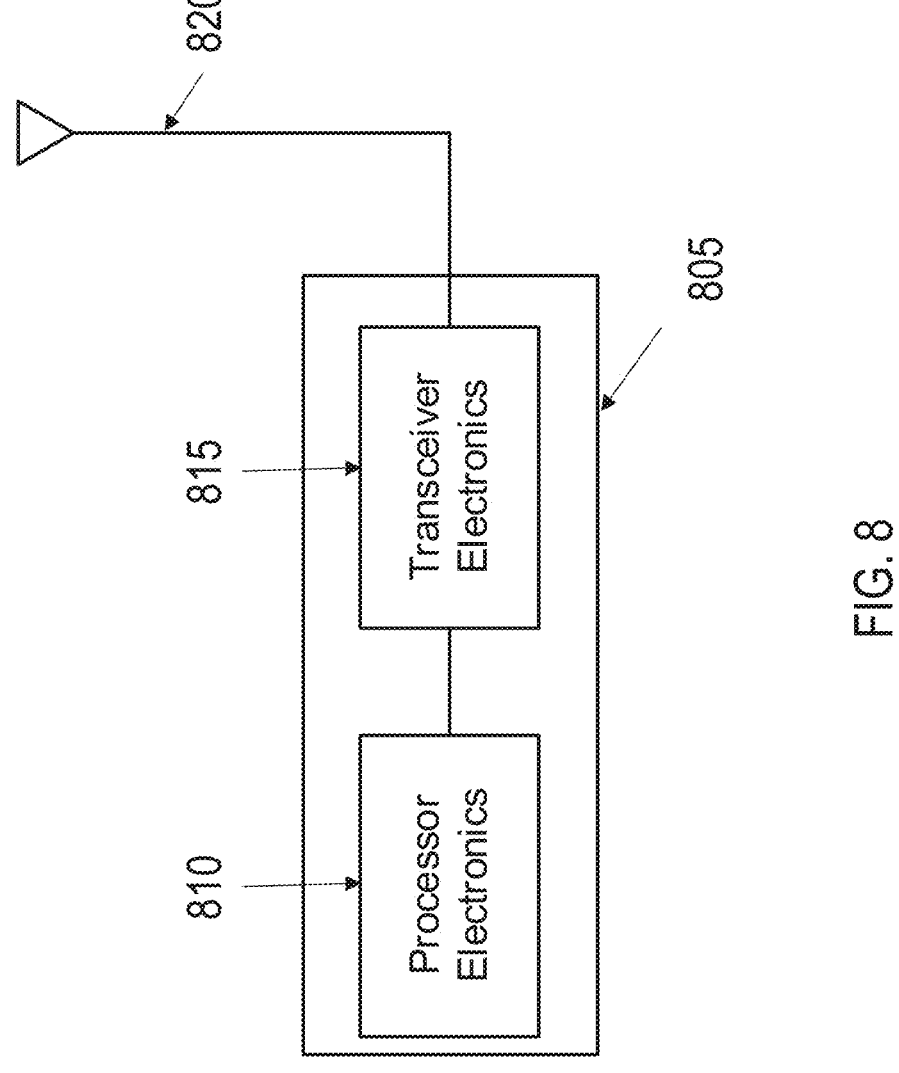
FIG. 8 is a block diagram representation of a portion of a radio station in accordance with one or more embodiments of the present technology can be applied.

FIG. 8 is a block diagram representation of a portion of a radio station in accordance with one or more embodiments of the present technology can be applied. A radio station 805 such as a base station or a terminal device (or a wireless device) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein.

It will be appreciated that the present document discloses techniques that can be embodied in various embodiments to enable terminal devices to use different carriers or bandwidth parts for uplink feedback transmissions and/or for retransmissions in either uplink or downlink direction. The disclosed techniques can provide flexibility in transmission scheduling for carrier-based or BWP-based scheduling so as to minimize delay caused by scheduling conflicts (e.g., no suitable slots on a particular carrier or BWP for HAQK-ACK reporting or retransmissions), thereby meeting the requirements for services such as URLLC.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a terminal device, a signaling message from a base station, wherein the signaling message indicates information about at least one cell of multiple cells for a Physical Uplink Control Channel (PUCCH) transmission within a duration of a slot of a reference cell, wherein the multiple cells comprise at least a primary cell and a secondary cell;

determining, by the terminal device, a cell for the PUCCH transmission from the multiple cells based on a position of the slot of the reference cell and the signaling message; and performing, by the terminal device, the PUCCH transmission to the base station using the determined cell during the slot of the reference cell;

wherein the position of the slot is determined by:

receiving, by the terminal device, a transmission from the base station at a slot $t_0$;

determining, by the terminal device, the position of the slot in the reference cell as $t_0+k_1$ based on the slot to and a timing parameter $k_1$, wherein the timing parameter $k_1$, determined by a Downlink Control Information (DCI) signaling, is an offset with respect to the reference cell.

2. The method of claim 1, wherein the reference cell is the primary cell or a cell having a smallest index of the multiple cells.

3. The method of claim 1, wherein, upon receiving the timing parameter from the base station, the method comprises determining the slot in the reference cell based on the timing parameter.

4. The method of claim 1, comprising:
determining that multiple slots are available for performing the PUCCH transmission during the slot of the reference cell; and
performing the PUCCH transmission to the base station using an earliest slot of the multiple slots in the secondary cell.

5. The method of claim 1, wherein the signaling message comprises a bitmap corresponding to one or more slots, and a number of bits in the bitmap is based on a period configured by the base station.

6. A method for wireless communication, comprising:
transmitting, by a base station, a signaling message to a terminal device, wherein the signaling message indicates information about at least one cell of multiple cells for a Physical Uplink Control Channel (PUCCH) transmission within a duration of a slot of a reference cell, wherein the multiple cells comprise at least a primary cell and a secondary cell;
receiving, by the base station, the PUCCH transmission from the terminal device using a cell during the slot of the reference cell,
wherein the cell is determined from the multiple cells based on a position of the slot of the reference cell and the signaling message;
wherein the position of the slot is determined according to:
performing a transmission from the base station to the terminal device at a slot to wherein the position of the slot in the reference cell as $t_0+k_1$ based on the slot to and a timing parameter $k_1$,
wherein the timing parameter $k_1$, determined by a Downlink Control Information (DCI) signaling, is an offset with respect to the reference cell.

7. The method of claim 6, wherein the reference cell is the primary cell or a cell having a smallest index of the multiple cells.

8. The method of claim 6, comprising:
transmitting, by the base station, the timing parameter to the terminal device to enable the terminal device to determine the slot in the reference cell based on the timing parameter.

9. The method of claim 6, comprising:

determining that multiple slots are available for receiving the PUCCH transmission during the slot of the reference cell; and receiving, by the base station, the PUCCH transmission using an earliest slot of the multiple slots in the secondary cell.

10. The method of claim 6, wherein the signaling message comprises a bitmap corresponding to one or more slots, and a number of bits in the bitmap is based on a period configured by the base station.

11. A terminal device for wireless communication, comprising at least one processor that is configured to:

receive a signaling message from a base station, wherein the signaling message indicates information about at least one cell of multiple cells for a Physical Uplink Control Channel (PUCCH) transmission within a duration of a slot of a reference cell, wherein the multiple cells comprise at least a primary cell and a secondary cell;

determine a cell for the PUCCH transmission from the multiple cells based on a position of the slot in the reference cell and the signaling message; and perform the PUCCH transmission to the base station using the determined cell during the slot of the reference cell;

wherein the position of the slot is determined by:

receiving, by the terminal device, a transmission from the base station at a slot $t_0$;

determining, by the terminal device, the position of the slot in the reference cell as $t_0+k_1$ based on the slot to and a timing parameter $k_1$, wherein the timing parameter $k_1$, determined by a Downlink Control Information (DCI) signaling, is an offset with respect to the reference cell.

12. The device of claim 11, wherein the reference cell is the primary cell or a cell having a smallest index of the multiple cells.

13. The device of claim 11, wherein, upon receiving the timing parameter from the base station, the at least one processor is configured to determine the slot in the reference cell based on the timing parameter.

14. The device of claim 11, wherein the at least one processor is configured to:

determine that multiple slots are available for performing the PUCCH transmission during the slot of the reference cell; and perform the PUCCH transmission to the base station using an earliest slot of the multiple slots in the secondary cell.

15. The device of claim 11, wherein the signaling message comprises a bitmap corresponding to one or more slots, and a number of bits in the bitmap is based on a signaling period configured by the base station.

16. A device for wireless communication, comprising at least one processor that is configured to:

transmit, from a base station, a signaling message to a terminal device, wherein the signaling message indicates information about at least one cell of multiple cells for a Physical Uplink Control Channel (PUCCH) transmission within a duration of a slot of a reference cell, wherein the multiple cells comprise at least a primary cell and a secondary cell;

receive the PUCCH transmission from the terminal device using a cell during the slot of the reference cell, wherein the cell is determined from the multiple cells based on a position of the slot of the reference cell and the signaling message;

wherein the position of the slot is determined according to:

performing a transmission from the base station to the terminal device at a slot $t_0$ wherein the position of the slot in the reference cell as $t_0+k_1$ based on the slot to and a timing parameter $k_1$, wherein the timing parameter $k_1$, determined by a Downlink Control Information (DCI) signaling, is an offset with respect to the reference cell.

17. The device of claim 16, wherein the reference cell is the primary cell or a cell having a smallest index of the multiple cells.

18. The device of claim 16, wherein the at least one processor is configured to:

transmit the timing parameter to the terminal device to enable the terminal device to determine the slot in the reference cell based on the timing parameter.

19. The device of claim 16, wherein the at least one processor is configured to:

determine that multiple slots are available for receiving the PUCCH transmission during the slot of the reference cell; and receive the PUCCH transmission using an earliest slot of the multiple slots in the secondary cell.

20. The device of claim 16, wherein the signaling message comprises a bitmap corresponding to one or more slots, and a number of bits in the bitmap is based on a signaling period configured by the device.

* * * * *